United States Patent [19]
Raulin et al.

[11] Patent Number: 4,811,476
[45] Date of Patent: Mar. 14, 1989

[54] METHOD OF MANUFACTURING A MAGNETIC TRANSDUCER INCLUDING A PLURALITY OF HEADS

[75] Inventors: Philippe Raulin, Hericourt; Jean-Pierre Messer, Grosne; Bernard Cherbuy, Belfort; Jacques Estavoyer, Bavilliers, all of France

[73] Assignee: Bull, S.A., Paris, France

[21] Appl. No.: 143,064

[22] Filed: Jan. 12, 1988

[30] Foreign Application Priority Data

Jan. 16, 1987 [FR] France ................... 87 00474

[51] Int. Cl.⁴ .................................................. G11B 5/42
[52] U.S. Cl. ........................................ 29/603; 29/856; 360/123
[58] Field of Search .................... 29/603, 854–856; 360/123, 124

[56] References Cited

U.S. PATENT DOCUMENTS

| | | | |
|---|---|---|---|
| 4,412,379 | 11/1983 | Lemke et al. | 29/603 |
| 4,736,210 | 4/1988 | Besinge | 29/603 X |
| 4,759,118 | 7/1988 | Nakashima | 29/603 |
| 4,759,120 | 7/1988 | Bernstein | 29/605 |

Primary Examiner—Carl E. Hall
Attorney, Agent, or Firm—Kerkam, Stowell, Kondracki & Clarke

[57] ABSTRACT

A method for manufacturing a magnetic transducer including a plurality of heads. This method comprises placing p magnetic cores (such as 17-4) on a support plate (20), each core being provided with a winding (such as E4) extending over the entire length of the core, coating these cores within an insulating film (25), removing the turns located at the ends of each core, and connecting the turns (29, 30) located at the ends of the remaining turns to contact zones (37c, P-1, P-2, etc.). The method applies to the manufacture of transducers with which magnetic printing machines are equipped.

24 Claims, 15 Drawing Sheets

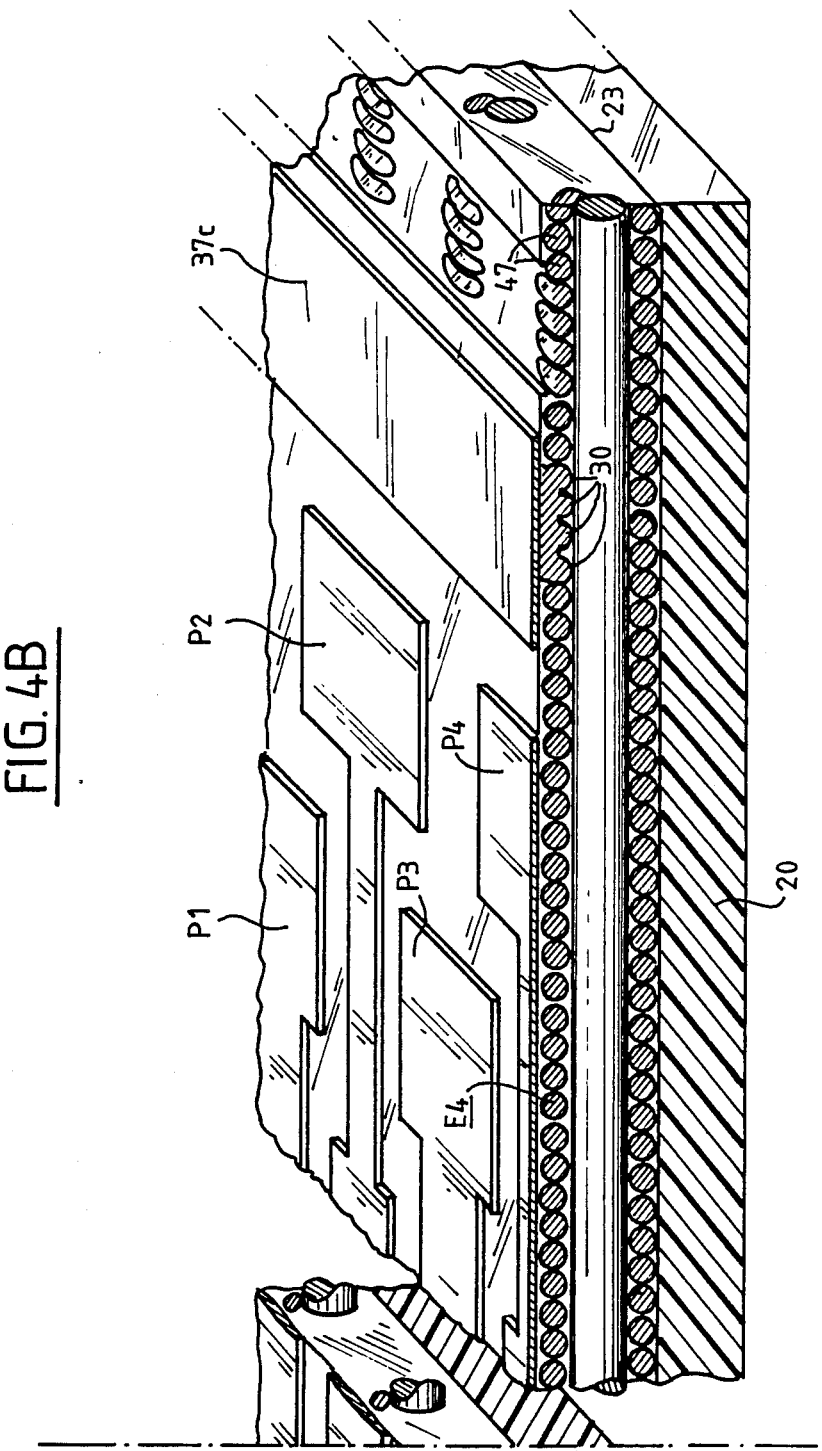

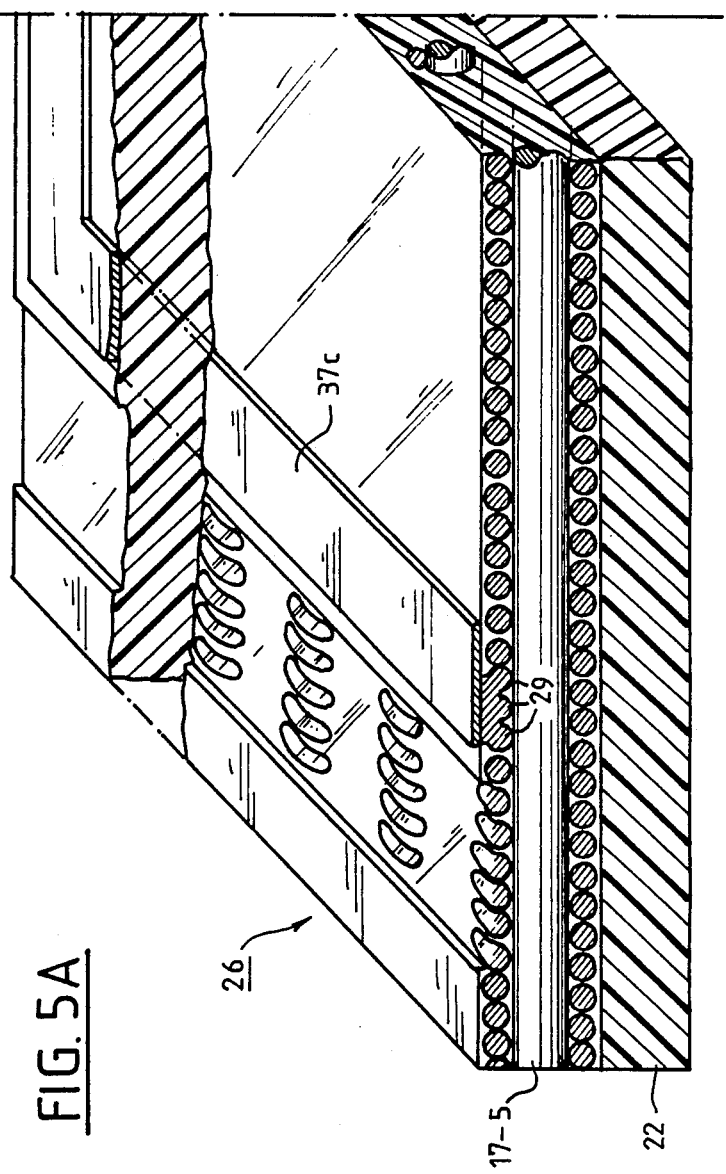

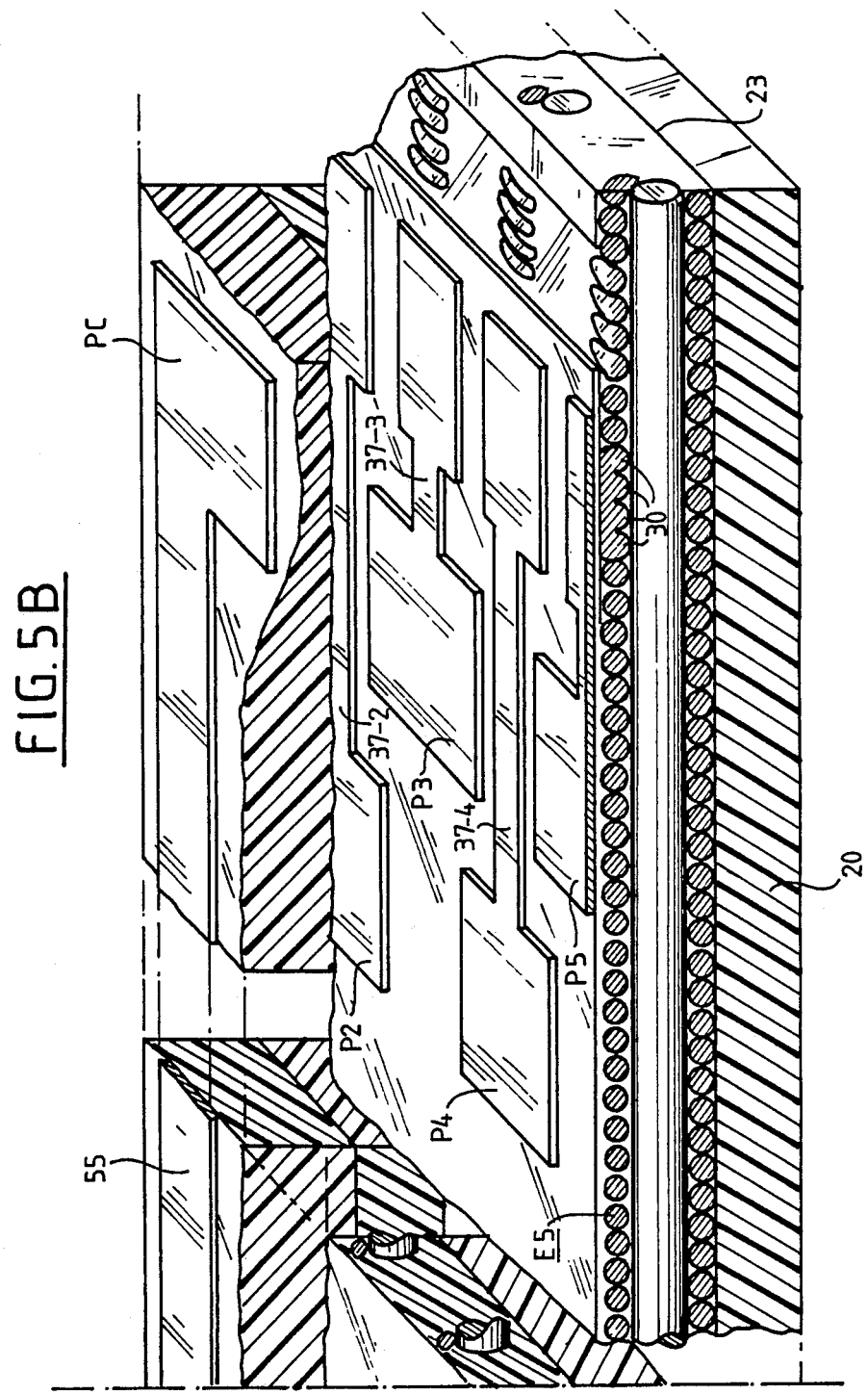

METHOD OF MANUFACTURING A MAGNETIC TRANSDUCER INCLUDING A PLURALITY OF HEADS

FIELD OF THE INVENTION

The present invention relates to a method for manufacturing a magnetic transducer including a plurality of heads. A transducer of this kind is used more particularly, but not exclusively, in magnetic non-impact printing machines.

BACKGROUND OF THE INVENTION

Printers of this type, as well as such apparatus as magnetic drum memories or magnetic disk units, are used for recording data and include a magnetic recording carrier which takes various forms, such as a drum, an endless belt or a disk, and is coated with a film of magnetic material. The recording of the data on this carrier is accomplished by means of a recording device known as a transducer, which includes one or more magnetic recording heads in proximity with which the recording carrier is displaced. Each of these heads, each time it is excited by an electric current of suitable intensity, generates a magnetic field, with the effect that magnetized zones of small dimensions are created on the surface of the recording carrier that travels past these heads; these zones are practically in punctuate form and are generally known by the term magnetized points. The portion of the surfaces of the carrier that accordingly travels past each head is typically called the data recording track, and the recording carrier generally includes a plurality of tracks which can be subjected to the recording, either individually in the course of successive recording operations, or simultaneously in the course of a single operation. To obtain better definition of the magnetized zones or points formed on the recording carrier, it has been proposed that the carrier be magnetized using what is known as the transversal recording mode; that is, the magnetic induction of each zone, in each of the magnetized zones thus formed, is practically perpendicular to the surface of the carrier. One such magnetizing mode proved to be particularly interesting in the case of magnetic printers, where in order to obtain a high-resolution printed image, a magnetic latent image must be recorded on the carrier, the various constituent points of the image being very small and very close to one another. To record this magnetic image, the prior art has employed a transducer including a plurality of magnetic heads disposed beside one another and aligned in a direction perpendicular to the direction of displacement of the recording carrier, each of the heads including a thin magnetic core on which an excitation winding is wound. This core is substantially U-shaped and is profiled in such a manner that it has a relatively narrow recording pole at one of its ends and at its other end it has a relatively wide flux closing pole; these two poles are placed in contact with or in immediate proximity with the surface of the recording carrier.

These heads make it possible to obtain perfectly defined, relatively small magnetized points on the recording carrier, the points for instance having a cross section on the surface of the carrier on the order of 100 to 200 $\mu m$ on a side. However, they have the disadvantage that each includes a core, which in the course of manufacture must be machined with very great precision, if the magnetized points formed by these various heads are to be substantially identical in size. Furthermore, with these heads, the time required for forming a magnetized point on the recording carrier is always relatively long, typically exceeding 6 microseconds, which naturally limits the performance of the machine in which these heads are used. These heads also have the disadvantage that each includes a magnetic core having faces with a relatively large surface area, which are placed facing the faces of the adjacent cores, so that when an attempt is made to dispose these heads close to one another in order to increase the density of the magnetized points and thus improve the quality of the printed characters, the magnetic flux generated by the excited heads causes leakage of flux, which circulating in the cores of the heads adjacent to the excited heads then causes the formation of undesirable magnetized points on the surface of the recording carrier.

These disadvantages can be overcome by making use of recording heads having a magnetic core that is provided with an exciting coil and takes the form of a rod or needle; the cores of these heads each have one end located at least in the immediate proximity of the surface of the recording carrier, and these ends are aligned one with the other along a direction perpendicular to the direction of displacement of the recording carrier. With these heads, the core of which is easy to manufacture, the time required for recording a magnetized point does not exceed 2 microseconds. Nevertheless, the emplacement of these heads inside the same transducer has always been a difficult operation to perform, especially because of the small diameter of the cores and their low rigidity.

In an embodiment described and shown in U.S. Pat. No. 3,890,623, in which the filamentary cores have a diameter in the vicinity of 0.8 mm, this placement is obtained by initially piercing a first series of aligned holes in a first support plate, each of the holes having a diameter sufficient to allow the engagement with slight play of one of the two ends of a core, then inserting each core, provided with its winding, into each of these holes, then keeping the core in place on this first support plate by piercing a second series of holes in a second support plate, in such a manner that the second series of holes are located perpendicular to the holes of the first series, and finally causing the other end of each core to engage the corresponding hole of this second series.

This manner of assembly, which can be used in the case where the magnetic cores have a diameter at least equal to 0.5 mm, cannot be employed for a magnetic transducer having heads with magnetic cores that have a very small diameter, for example less than 0.1 mm. This is because the filamentary magnetic cores, having an equally small diameter, would have too little mechanical rigidity to undergo the various operations of assembly as described above without being deformed.

OBJECT AND SUMMUARY OF THE INVENTION

The present invention proposes a method with which a magnetic transducer including a plurality of heads with filamentary magnetic cores can be manufactured, even in the case where these cores have a small diameter, that is, less than 0.5 mm.

More precisely, the present invention relates to a method for manufacturing a magnetic transducer adapted for the recording and/or reading of data on a magnetic carrier, this transducer including at least one row of p magnetic heads, each of these heads comprising an elongated magnetic core provided with an excitation winding, this method including the formation of a winding of insulated conductor wire on each magnetic core, this method being characterized in that it further comprises:

making at least one elementary block by disposing p cores, each provided with a winding, on a support plate having two opposed edges, in such a manner that these p cores extend between these two edges;

embedding all of these p cores in a film of hardenable insulating substance;

attacking the surface of this film, after hardening of this substance, in such a fashion as to expose two first groups of turns on each winding, these turns being located respectively in the vicinity of each of the ends of this winding;

and forming on each surface contact zones connected to said first groups of turns, in such a manner as to allow connecting these windings to an electrical control circuit.

According to a particular feature of the method that is the subject of the invention, in which each winding extends over the entire length of the core about which it is wound, this method further comprises:

attacking the surface of the film of insulating substance in such a manner as likewise to expose two second groups of turns on each winding, located respectively in proximity with each of the edges of this winding, between this end and the first group of turns which is adjacent to this end;

and eliminating said second groups of turns on each winding.

Because of this elimination, the windings coiled on the various cores are not at risk of coming into contact with the surface of the magnetic recording carrier when the ends of these cores are applied to this conductive surface, which avoids the involuntary excitation of certain windings by parasitic electric currents circulating in the carrier at the time the data are recorded onto the carrier. Also, after machining operations that as will be seen hereinafter are performed on the terminal portions of the magnetic cores, this elimination prevents each of these two ends of each winding wound on each core from being put into electrical contact with the conductive material comprising this core, which would have the effect of short-circuiting the winding wound on this core.

The invention likewise relates to a magnetic transducer manufactured by this method.

The invention will be better understood and further objects and advantages thereof will become more apparent from the ensuing description, which is given by way of non-limiting example taken in conjunction with the drawings.

BRIEF DESCRIPTION OF THE DRAWINGS

FIGS. 4A and 4B, when assembled together, show a detailed view of a first disposition of conductor bars serving to excite the windings of the transducers;

FIGS. 5A and 5B, when assembled together, show a detailed view of a second disposition of conductor bars serving to excite the windings of the transducers;

DESCRIPTION OF THE PREFERRED EMBODIMENTS

Figure 3:
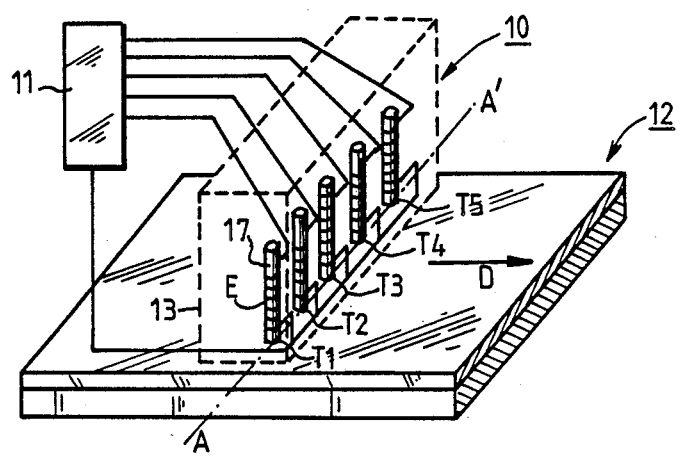
FIG. 3 is a schematic view showing the respective disposition of the magnetic heads with which a magnetic transducer that can be made by the method according to the invention is equipped.

FIG. 3, in a highly schematic manner, illustrates a magnetic transducer 10 which upon receiving electrical signals representing data sent from a control unit 11 records the data, in the form of magnetized zones, on a magnetic recording carrier 12. It should be noted, however, that while this transducer is used here for recording signals, the same transducer can also be used to detect the presence of recorded magnetized zones on a magnetic recording carrier, for the purpose of converting them into electrical signals. A transducer of this kind, which enables the recording or reading of data on a magnetic carrier, typically includes a plurality of magnetic heads T1, T2, T3, and so forth, which as shown in FIG. 3 are mounted inside a support block 13. The unit comprising these magnetic heads and this support block is ordinarily called a module. These heads are of the type described in U.S. Pat. Nos. 3,890,623 and 3,301,948 and each include a magnetic core 17, in the form of a needle, comprising a soft magnetic material such as an iron-silicon alloy containing approximately 4% silicon. The core 17 is surrounded by a winding E which may be selectively excited by the electrical signals emitted by the control unit 11. Thus as can be seen from FIG. 3, the cores of the various heads T1, T2, T3, and so forth are placed one beside the other, perpendicular to the surface of the recording carrier 12, and their lower ends are aligned in a direction AA' which is parallel to the surface of the support 12 and forms an angle that is not 0 with the direction of displacement D. In the exemplary embodiment illustrated by FIG. 3, this direction AA' is perpendicular to the direction of displacement D.

Although for the sake of simplification only five magnetic heads T1-T5 have been shown in FIG. 3, it will be understood that the number of magnetic heads of the transducer 10 may be different from that shown in these drawings. It should also be noted that in the preferred embodiment which will be described hereinafter, the transducer includes at least one row of 168 magnetic cores aligned along the same direction AA', each core having a diameter practically equal to 70 $\mu$m, with the cores having a center-to-center spacing substantially equal to 212 $\mu$m. Under these conditions, by exciting the windings wound on these cores for a brief instant, practically punctuate magnetized zones can be obtained on the recording support 12, the zones bein spaced apart by a spacing interval of 0.212 $\mu$m in a direction parallel to the direction AA'. However, as will be seen hereinafter, it is also possible to obtain punctuate magnetized zones on the recording carrier 12 that have a smaller spacing, by providing, in addition to the row of magnetic heads aligned along the direction AA', at least one other row of magnetic heads in the transducer 10, which are aligned along a direction parallel to the direction AA' but offset by a fraction of the spacing interval with respect to the magnetic heads of the first row.

In the embodiment shown in FIG. 3, the circuits 11 which control the excitation of the windings of the various heads T1, T2, and so forth are all accommodated outside the module 10. However, it should be noted that this kind of embodiment is not exclusive in the present invention, and as will be seen hereinafter, some of these circuits can be located inside the module.

Figure 1A:
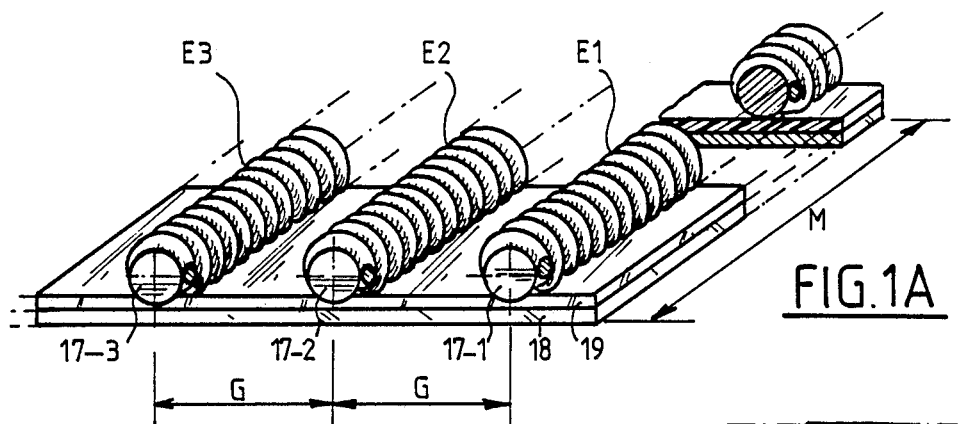
FIGS. 1A-1M illustrate the various phases of a first embodiment of the method of manufacture with which a magnetic transducer can be obtained according to the invention.

Referring now to FIGS. 1A–1M, the successive phases of a first mode of performing the method according to the invention, with which a magnetic transducer of the type schematically shown in FIG. 3 can be obtained, will now be described. In order to be performed, this method requires a number p of filamentary magnetic cores, this number p being equal, in the example described, to 168, each of these cores comprising a soft magnetic material and being provided with an excitation winding. In FIG. 1A, only three of these cores, identified by reference numerals 17-1, 17-2, 17-3, have been shown; the windings carried by these cores are identified respectively, in the drawing figure, by reference numerals E1, E2 and E3. The soft magnetic material, which in the example described has been preferentially selected to comprise each of these coils, is an iron-nickel alloy manufactured industrially by the company known as Societe Metallurgique d'Imphy under the tradename "Anhyster DS"; this alloy contains 50% nickel and 50% iron. Nevertheless, it should be noted that this material is not exclusive to the invention, and that each magnetic core 17 could be made of any other soft magnetic material. In a particularly advantageous mode of manufacture, the magnetic cores provided with their windings are made by cutting a very long wire of magnetic material, about which an insulated conductor wire has already been wound, into sections, or lengths. The winding of the conductor wire is done continuously using a coil winding machine of a known type. The conductor wire which is used in the example described to make up this winding is an insulated copper wire the diameter of which is equal to 40 $\mu$m. In the example described, it is assumed that this winding is performed for adjacent turns, all in one layer, on a wire of magnetic material the diameter of which is equal to 70 $\mu$m.

It is also assumed that the wire of magnetic material about which the insulated conductor wire has been wound is long enough that when it is cut into lengths, p portions of wire all having the same length M are obtained, each of these p portions comprising a magnetic core provided with its excitation winding, the excitation winding thus extending over the entire length of this core. The magnetic cores 17-1, 17-2, ..., 17-p and their respective windings E1, E2, ..., Ep, which are obtained in this manner, are fixed one beside the other as shown in FIG. 1A on a metal sheet 18, the surface of which has been coated beforehand with a film 19 of adhesive insulating material. In the example described, it is assumed that this metal sheet 18, which is rectangular in shape, comprises a thin strip of copper having a thickness on the order of about 20 $\mu$m and a width M in the range of 5 mm. Thus as FIG. 1A shows, the cores 17-1, 17-2, ..., 17-p are disposed parallel to the width M of this sheet 18 at regular intervals, the spacing interval G of the cores being equal to 212 $\mu$m, in the example described. It is also assumed that in the example described the sheet 18 has a length of approximately 35.5 mm, such that the maximum number of cores that can thus be placed on this sheet is equal to 168. The fixation of these cores on this sheet is assured by the film 19 of adhesive insulating material, which in the example described comprises a polymerizable resin, the polymerization of which is undertaken only after these magnetic cores have been put in place on the sheet 18.

As the numerical values given above suggest, it can be noted that the various constituent elements of the units shown in the accompanying drawings have not all been drawn onto scale, and that the dimensions of some of them have voluntarily been exaggerated for the obvious sake of clarity in the drawings.

Figure 1B:
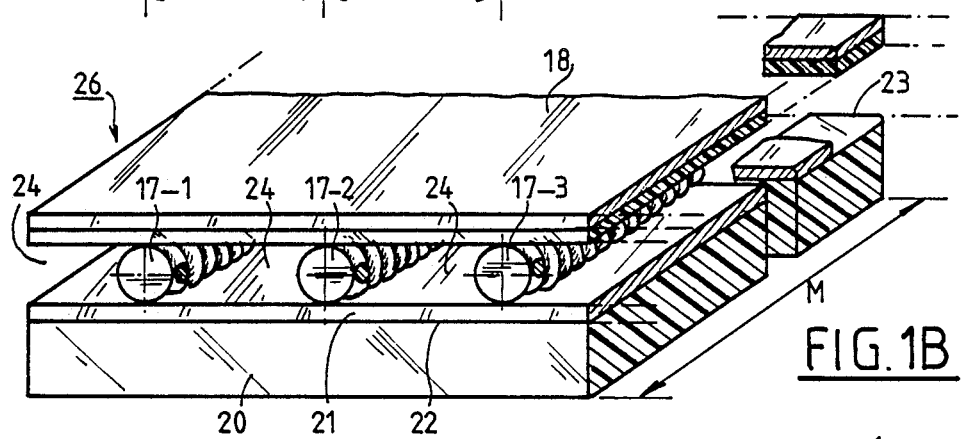
Figure 1C:
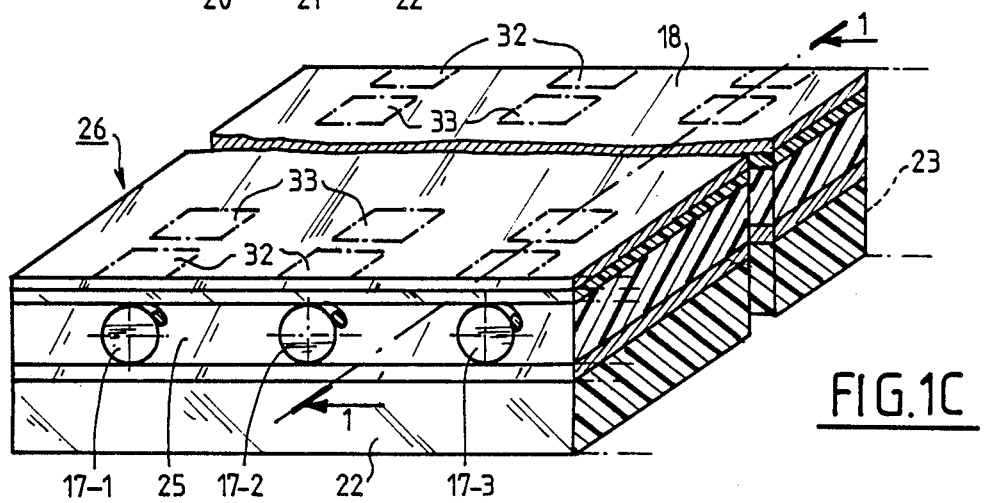

The assemblage obtained once the fixation of the magnetic cores on the sheet 18 has been completed is then turned over and placed, as shown in FIG. 1B, on a support plate 20, the surface of which has been coated beforehand with a film 21 of adhesive insulating material. Except for its thickness, this support plate 20, which is parallelepiped in shape, has the same dimensions as the metal sheet 18. Thus as will be understood from FIG. 1B, the placement on the support plate 20 of the assemblage comprising the sheet 18 and the magnetic cores glued onto it is performed by first placing this assemblage above the support plate 20, in such a way that the magnetic cores are oriented perpendicular to the long edges 22 and 23 of this plate, and then by applying this assemblage to the plate in order to put the cores into contact with the film 21 of adhesive insulating material. Under these conditions, the fixation of the cores on the support plate 20 is assured by this film 21, which in fact in the example described comprises a polymerizable resin, the polymerization of which is not performed until the assemblage embodied by the sheet 18 and the magnetic cores has been put into place on the support plate 20. Once this fixation has been completed, a block 26 of parallelepiped shape is obtained, as shown in FIG. 1B, but in which empty spaces 24 still remain. These spaces are then filled by means of a molding resin which is introduced into the spaces using a known technique of vacuum impregnation. It is assumed that the molding resin used in the example described to accomplish this filling is an epoxy resin industrially manufactured Ciba-Geigy. However, it should be noted that this type of moling resin is not specific in the present invention, and to accomplish this filling any other type of suitable resin, such as an acetal resin, can be used. The block obtained once this resin has hardened is shown in FIG. 1C. The magnetic cores 17-1, 17-2, ... 17-p which are interposed inside this block between the sheet 18 and the support plate 20 have now been embedded in a film 25 of insulating resin, as have the windings E1, E2, ... Ep which are wound on these cores. As a consequence, only the ends of these cores show on the opposed faces 22 and 23 of the block 26, these faces in fact coinciding with the long edges of the support plate 20.

It should now be noted that the films 19 and 21 of adhesive insulating material, because of the physical role which they play in the structure of the block 26, are part of the film 25 of insulating resin and films 19 and 21 may be formed of the same resin as that comprising the film 25. For this reason, in the description below, these three films are not distinguished from one another, and all of these three layers, or films, will be simply assimilated into one single layer, which nevertheless will be described as the resin film 25.

Figure 1D:
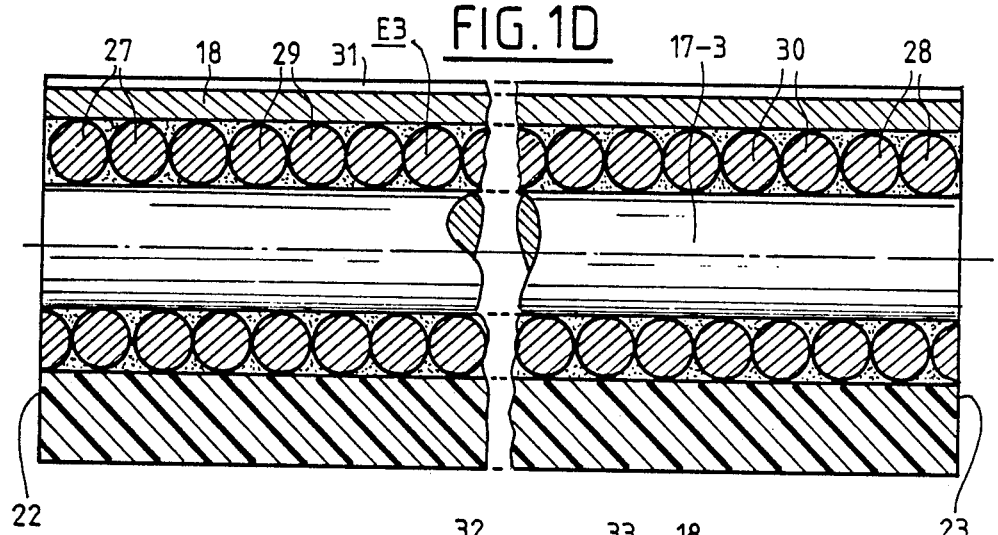

The operations in the method of the invention that permit the connections of these windings E1, E2, ..., Ep, which have thus been made inaccessible, to an electrical control circuit will now be described. For better comprehension of the detail of these operations, FIGS. 1D–1L, which illustrate the various operational phases performed, will be referred to. For obvious reasons of simplification, the phases shown in these figures are related to only a single one of the magnetic cores and to the winding carried by the core. FIG. 1D is a fragmentary sectional view of a fraction of the block 26 along a plane perpendicular to the surface of the sheet 18 and passing via a line indicated as 1—1 in FIG. 1C. In this FIG. 1D, the magnetic core 17-3 is seen, the ends of which are located perpendicular to the faces 22 and 23 of the block 26, as well as the winding E3 which is wound onto this core. This winding E3 includes a plurality of turns, some of which, such as those designated by reference numerals 27 and 28, are located in proximity with the ends of the magnetic core 17-3. The turns 27 thus comprise one group of turns located in proximity with the face 22 of the block 26, and the turns 28 comprise another group of turns located in proximity with the face 23 of this block. In the example shown in FIG. 1D, each of these groups includes only two turns, but it will be understood that in reality, for reasons which will become apparent below, the number of turns comprising one group can be greater and will be selected equal to a fixed predetermined number, for example 6. These two groups 27 and 28 of turns will be referred in the ensuing description as second groups of turns. Next to the group 27 of turns, there is a group 29 of turns, which may or may not be contiguous with the group 27 of turns.

Similarly, next to the group 28 of turns, there is a group of turns 30, which may or may not be contiguous with the group of turns 28. In the example shown in FIG. 1D, each of the groups 29 and 30 includes only two turns, but it will be understood that in reality, for reasons which will become apparent below, the number of turns of each of these groups 29 and 30 may be higher. In the ensuing text, these two groups 29 and 30 will be referred to as first groups of turns.

Figure 1E:
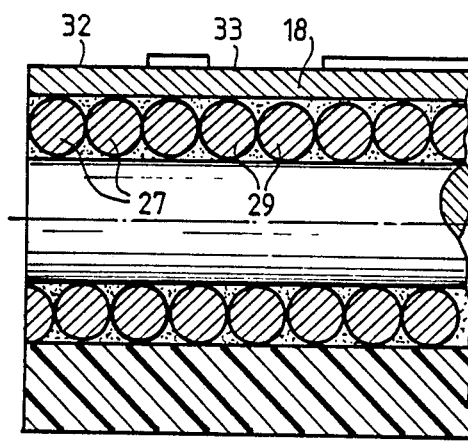
Figure 1F:
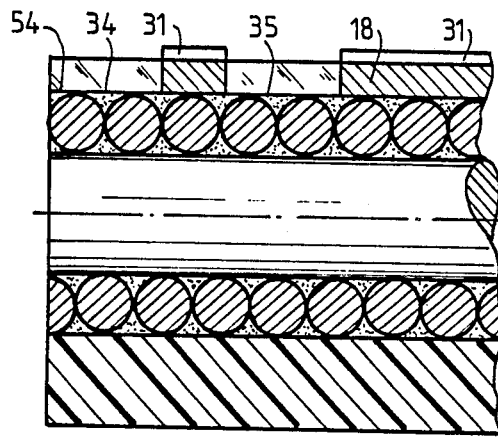
Figure 1G:
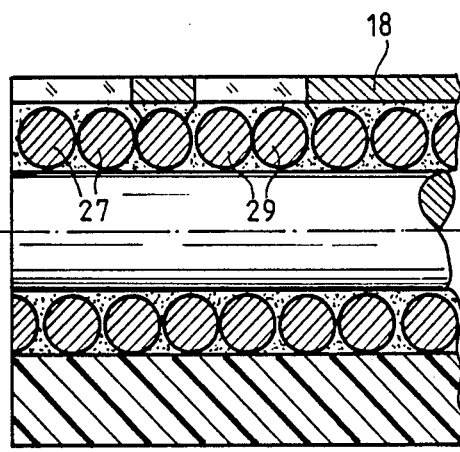

In order to enable the windings E1, E2, ..., Ep to be connected to an electrical control circuit, a coating 31 of photosensitive resist is first applied to the surface of the sheet 18, as indicated in FIG. 1D. After precuring and insulation via a mask, this resist coating is developed; the mask and the type of resist used are selected such that at the end of these operations, the resist coating has been eliminated, as seen in FIG. 1E, from the regions 32 and 33 of the surface of the sheet 18, which are located respectively facing the second and first groups of turns of each winding. In order to better specify their location, these regions 32 and 33 have been shown in perspective in FIG. 1C in the form of small rectangles drawn in dot-dash lines. The regions 32 and 33 which have thus been exposed are then subjected to chemical etching. As a result, as can be seen in FIG. 1F, the material comprising the sheet 18 is eliminated from these regions, and a portion of the surface 54 of the resin film 25 which until then was covered with this sheet, is uncovered. This uncovered portion of the surface is embodied by the portions of the surface 34 and 35 that were located underneath the regions 32 and 33. In the example described, where the metal sheet 18 is of copper, this etching operation is performed with the aid of a solution of iron perchloride, as is known, for a period of time that taking into account the thickness of this sheet is on the order of about 30 seconds. After that, the block 26 is rinsed with water, and then after being dried is placed in an oxygen plasma etching apparatus, where its face on which the surface portions 34 and 35 appear is subjected to a reactive ionic etching operation. This operation, which is performed for about 20 minutes in a container containing a gas, at a reduced pressure of several tens of millitorr, the gas comprising approximately 90% by volume of oxygen, the remainder being sulfur hexafluoride or freon, with the effect that as shown in FIG. 1G, all the organic insulating materials that have not been covered with metal material on the attacked face of the block 26 are eliminated. Thus in the course of this attack, not only are the portions underneath the coating 31 of photosensitive resist removed entirely, along with the portions of the resin film 25 that have been exposed following the etching of the metal sheet 18; the insulating enamel covering the exposed portions of the second and first groups of turns 27, 28, 29 and 30 is eliminated totally as well, so that the metal portion of these turns is now exposed. When the operation of reactive ionic etching has been completed, the exposed turns and the metal sheet 18 undergo cleaning by immersion in a solution of ammonium persulfate as well as ionic cleaning by argon bombardment.

Figure 1H:
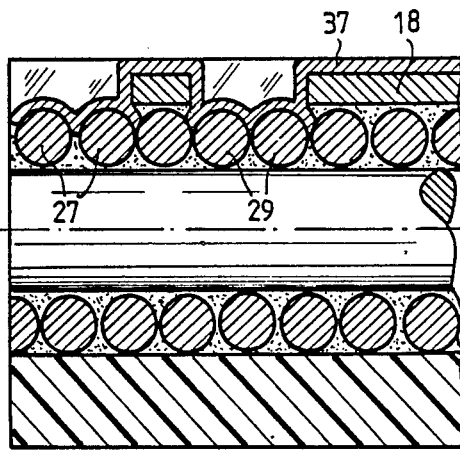
Figure 1I:
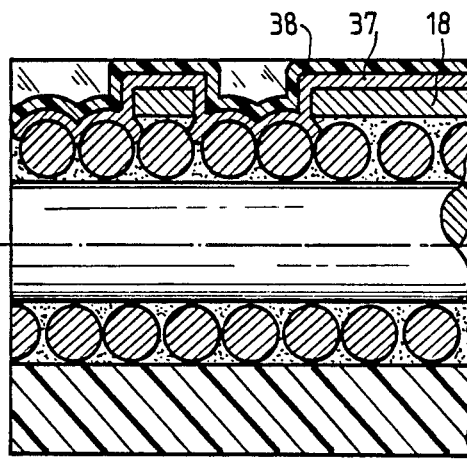
Figure 1J:
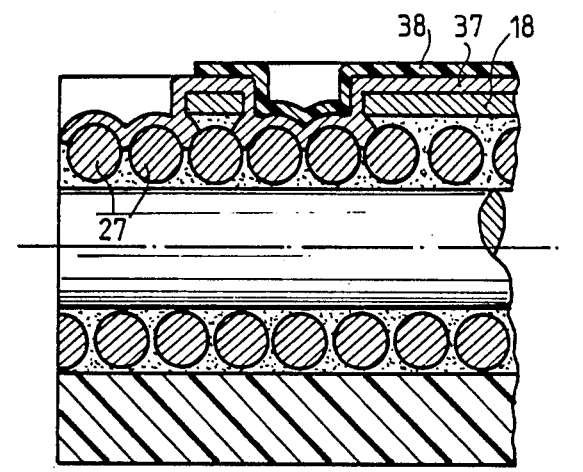
Figure 1K:
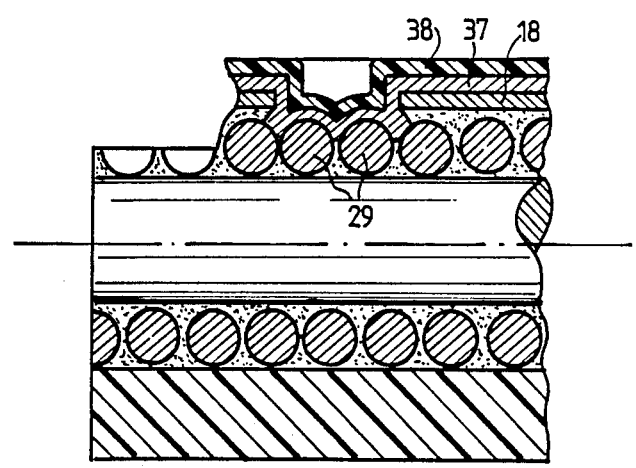
Figure 6:
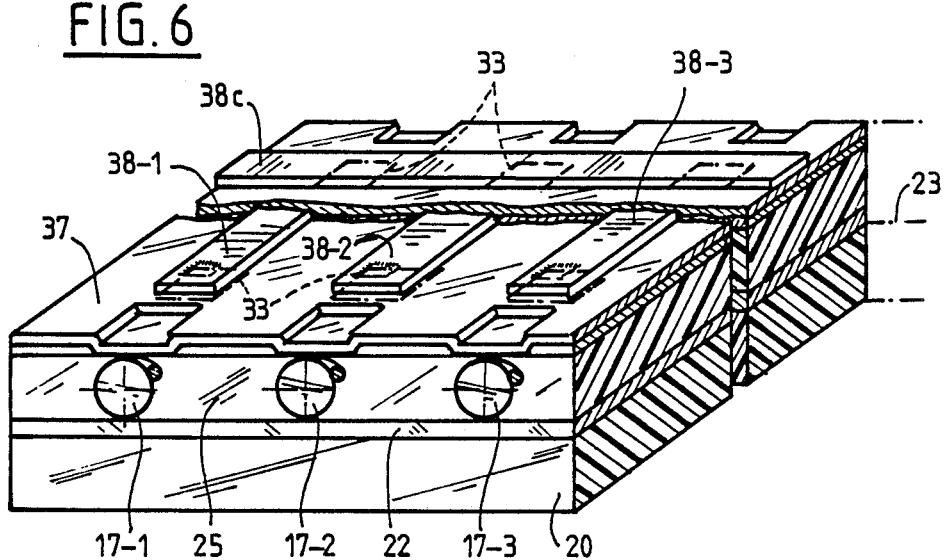
FIG. 6 is a perspective view intended to show in a more detailed manner one of the operational phases performed when the method illustrated by FIGS. 1A-1M is performed.

After that, a film 37 of conductive metal is deposited on these turns and on the metal sheet 18, as shown in FIG. 1H. This film comprises copper and is preferably deposited either chemically or by using the well-known process of cathodic sputtering. Although the thickness of this film 37 is quite slight, that is, approximately 10 $\mu$m, it will be understood that all the turns comprising the first and second group of turns are connected with one another and with the sheet 18 via this electrically conductive film 37. Once this operation has been completed, a coating 38 of photosensitive resist is then deposited on this film 37, as shown in FIG. 1I. The role of this coating is to permit the metal film 37 and the metal sheet 18 to be etched simultaneously, in accordance with a predetermined configuration, so that the portions of this film and of this sheet that remain after the etching form a series of contact zones and conductor bars on the face of the block 26 on which this sheet is located. The contact zones and conductor bars, as will be seen below, are intended to assure to electrical connections necessary for the excitation of the various windings. After precuring and insulation through a mask, this coating of resist is developed; the mask and the type of resist used are provided in such a manner that at the end of these operations, the resist coating 38 is partially eliminated from the surface of the metal layer 37, as shown in FIG. 1J. The non-eliminated portions of this resist, as can be seen in FIG. 6, form a strip of resist 38c on the surface of this film 37. This strip extends parallel to the edge 23 of the support plate 20, and passes perpendicular to the regions 33 mentioned above. These regions here are those that are the closest to the edge 23. Also formed by the resist on the surface of the film 37 are p strips of resist 38-1, 38-2, ..., 38-p, being equal in number to the number of magnetic cores 17-1, 17-2, ..., 17-p; these p strips cover the portions of the film 37 that are located perpendicular to the regions 33 that are the closest to the other edge 22 of the support plate 20, and each of these latter resist strips extends in a direction perpendicular to the longitudinal direction of the strip 38c. These resist strips have a configuration that will be described in further detail below, and which is provided such that by etching of the metal film 37, it is possible first to obtain contact zones sufficiently large that the operations of connecting the windings to an electrical control circuit can easily be accomplished, and on the other hand conductor bars can be obtained that assure the necessary connections among the contact zones and the first groups of turns that are located in the vicinity of the ends of these windings.

When the operation that just been described is completed, the face of the block 26 that has been coated with the metal film 37 is subjected to an etching operation, effected by means of a solution of iron perchloride. This operation, which is performed for a period of time on the order of several tens of seconds, has the effect of eliminating all the portions of the metal film 37 which are not protected with the photosensitive resist 38, as well as the portions of the metal sheet 18 that are located beneath the attacked portions of the film 37; this can be seen in FIG. 1K. In the course of this same operation, once the portions of the metal film 37 that cover the regions 32 have been eliminated, the second groups of turns 27 and 28 which are located beneath these regions 32 are attacked in turn, in such a manner that once this etching operation is completed, these second groups of turns are practically eliminated, or are at least reduced to the state of metal fragments that are electrically insulated from one another and from the other turns that have remained intact in the windings to which these groups of turns initially belonged. Under these conditions, once the resist strips 38c, 38-1, 38-2, . . . , 38-p have then been removed, then as seen in FIGS. 4A and 4B taken together, the result is a block 26 provided on its face that was subjected to the etching operation, with conductor bars 37c, 37-1, 37-2, . . . , 37-p and p contact zones P-1, P-2, P-3, etc.; these conductor bars and contact zones thus result from the etching of the metal film 37; as noted above, the mask used for this operation is selected such that after the etching, the remaining portions of this film have the configuration shown in FIGS. 4A and 4B.

Figure 1L:
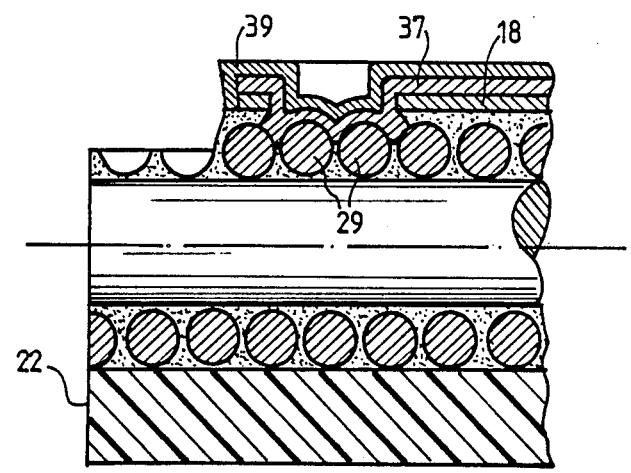
Figure 4A:
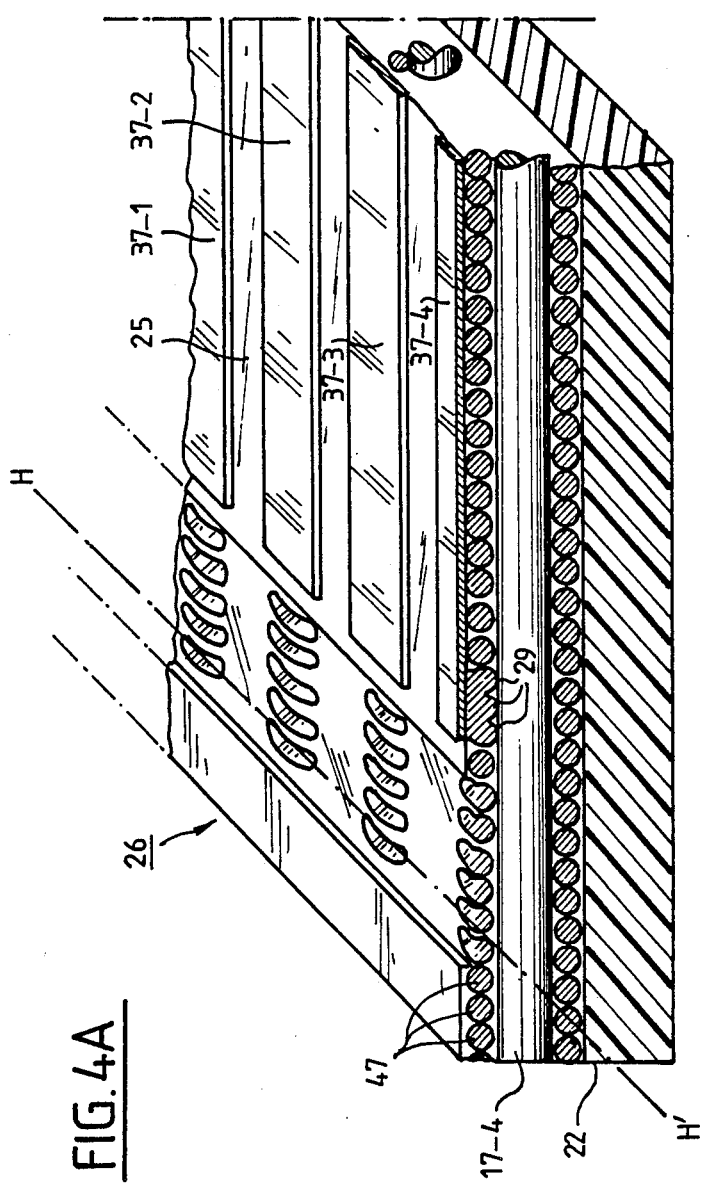

In the configuration shown in FIGS. 4A and 4B, the first groups of turns 30 of the windings E1, E2, . . . , Ep are all connected with one another via the conductor bar 37c, while the p contact zones P-1, P-2, P-3, etc., which are equal in number to those of the windings E1, E2, . . . , Ep, . . . , are each connected respectively via one of the p corresponding conductor bars to the first groups of turns 29 of each of these p windings. Thus as will be seen below, the conductor bar 37c and the p contact zones P-1, P-2, P-3, . . . , are intended to be connected to a control circuit provided for selective control of the excitation of the various heads. Nevertheless, before this connection is made, a metal coating 39 is deposited as shown in FIG. 1L on the contact zones and on the conductor bars 37c, 37-1, 37-2, . . . , the role of this coating being to facilitate the soldering operations performed later in order to assure this connection, while protecting these zones and bars from the corrosive action of oxygen, humidity, and the various acids contained in the atmosphere. In the example described, this coating is in fact double, and includes one coating of nickel, several microns in thickness, coated with a very fine coating of gold at least 1 micron in thickness; these two coatings are deposited electrolytically.

Block 26 is then subjected at least on its face 22 to a surface treatment intended make the surface of this face such that, as will be seen below, the face is capable of coming into contact with the surface of a magnetic recording carrier without risking deterioration of this surface when it is driven for displacment. Moreover, as can be seen in FIGS. 4A and 4B, the turns, which since they belong to the second groups of turns have been eliminated, may happen to be located at a very slight but not zero distance from the faces 22 and 23. In this case, after the elimination of these turns, turns can still remain intact in the intervals between these faces and the eliminated turns that were adjacent to these faces, these intact turns being such as those shown at 47 in FIGS. 4A and 4B. These turns 47, which do not play any role at all in the functioning of the heads, can be easily eliminated by sawing of the block 26 along two planes parallel to the faces 22 and 23, these two planes each passing respectively through the two regions of the block 26 where the turns that have been eliminated, since they belong to the second groups of turns, were located. In FIG. 4A, the outline of one of these planes has been symbolically represented by a dot-dash line HH'. The new faces of the block 26 resulting from this sawing are then subject to the above-mentioned operation of surface treatment.

After all these operations, the result, as seen in FIGS. 4A and 4B taken together, is then a block 26 in which the various windings coiled on the magnetic cores are each comprised of the turns that remain intact, which are included between the first two groups of turns 29 and 30 of each winding and in which, because of the elimination of the second groups of turns, each magnetic core has at its ends two portions of its length that have been completely denuded of turns. Since the surface-treated face 22 of the block is intended for being put into contact with the surface of a magnetic recording carrier, this arrangement prevents the windings coiled on these cores from being in contact with this surface, so that they are not deteriorated thereby when this surface is driven for displacement. This arrangement also prevents the situation in which, when data are recorded onto the magnetic recording carrier, certain windings may be involuntarily excited by parasitic electrical currents crrculating in the carrier. To prevent this risk of deterioration following a reduction in the length of the cores after machining and after prolonged use of the transducer, it is preferable that the number of turns belonging to each second group of turns not be too small. Accordingly, in the example described, this number is equal to at least four. Moreover, since the electric excitation of each coiled winding, for example the winding Ei, is accomplished by causing an electrical current to circulate in the portion of the circuit comprising the contact zone P-i, the conductor bar 37-i, the winding Ei and the conductor bar 37c, it is important that the number of turns comprising each of the first group of turns 29 and 30 be sufficiently high that the electrical resistance of the connections assured by these groups of turns does not limit the intensity of the currents circulating in each portion of the circuit to a value less than that necessary for correct functioning of the heads. In example described, where the turns have a diameter of 40 μm and are coiled on a magnetic core having a diameter of 70 μm, it has been found that the number of turns comprising each of the first group of turns must be at least equal to two.

Figure 1M:
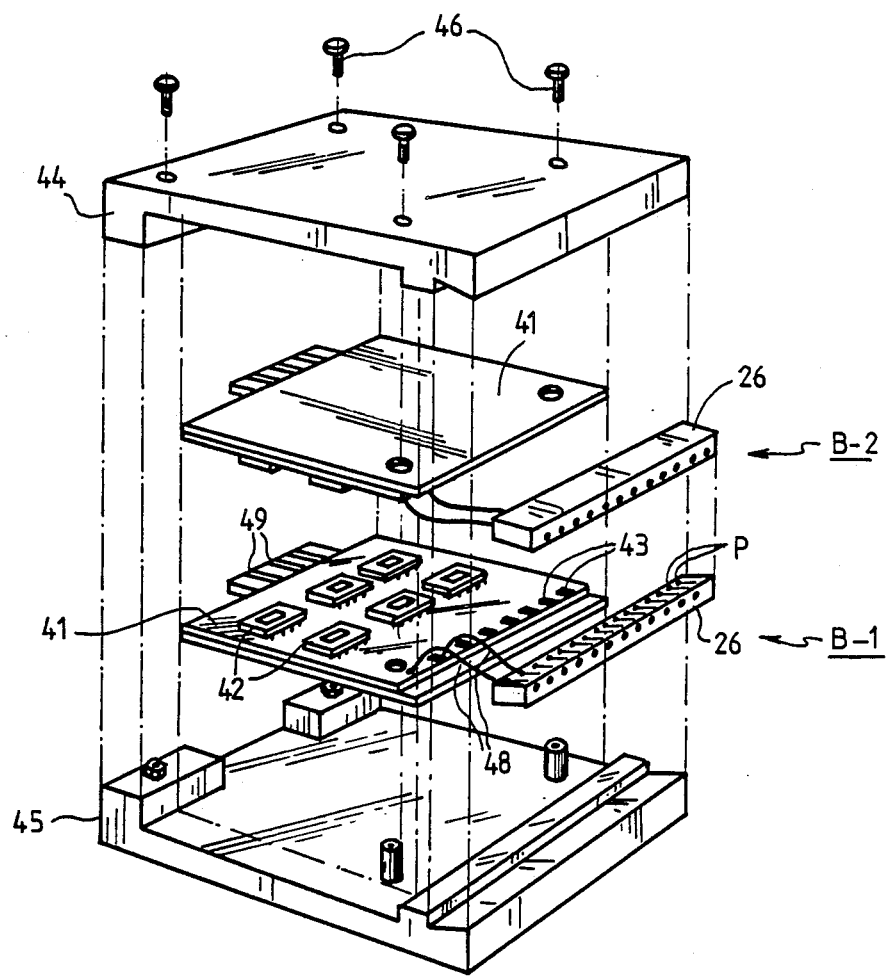

The block 26 which is obtained once the above-described operations have been completed is then juxtaposed, as FIG. 1M shows, with a connection card 41, typically called a substrate; this card is provided with a logical control assembly comprising electronic components 42. The logical control assembly is part of the aforementioned control unit 11. The connection card 41 is embodied by a rigid rectangular plate of insulating material, provided in a known manner with a printed electrical circuit (not shown) which assures the indispensable connections among the various electronic components 42 mounted on the card, as well as among these components and the contact zones 43 with which the card is provided on one of its edges.

The number of contact zones 43 of the card 41 is equal to p+1, p being the number of contact zones P-1, P-2, P-3, ... of the block 26, these last contact zones being designated in FIG. 1M with the general reference symbol P for obvious reasons of simplification. Thus one contact zone of the card 41 corresponds with each of the p contact zones of the block 26. The (p+1)th contact zone 43 of this card is intended for connection with the conductor bar 37c of the block 26; this bar is not shown in FIG. 1M, for the sake of simplification.

As can be seen in FIG. 1M, the connection card 41 is also provided with contact lamellas 49 on its edge opposed to that having the contact zones 43; the purpose of the contact lamellas is to permit all the electronic components 42 mounted on the card to be connected to a source of electrical supply or to other external electric circuits (not shown) which are part of the control unit 11.

The assembly designated by the symbol B-1 in FIG. 1M omprises the card 41 and the block 26 and is then placed as shown in the drawing inside a package that includes two rigid caps 44 and 45 that can be assembled with one another via known fixation elements, for example such as screws 46. FIG. 1M shows that these two caps are shaped such as to permit the assembly B-1 and another assembly B-2, which is similar to the assembly B-1, to be accommodated inside the package obtained when the two caps 44 and 45 are affixed to one another. As will be explained below, this arrangement makes it possible to obtain a transducer capable of forming magnetized zones on a recording carrier that are distributed at a spacing interval equal to one-half the spacing G (see FIG. 1A) in accordance with which the magnetic cores are distributed in the block 26.

Once the card 41 and the block 26 comprising the assembly B-1 have been put into place in the package, then as shown in FIG. IM the electrical connections among the p contact zones of the block and the p contact zones of the card, on the one hand, and between the conductor bar 37c of the block and of the (p+1)th contact zone of the card, on the other hand, are effected; all these connections are made by means of conductor wires 48. This operation can be done either manually or, preferably, entirely automatically, using a suitable wiring machine of a known type.

It should now be remembered that the magnetic heads incorporated inside the block 26, each comprising a magnetic core provided with a winding, are distributed with a spacing G, which in the example described is equal to 212 $\mu$m. In the case where it is desired to make a magnetic transducer capable of forming punctuate magnetized zones on a recording carrier that are distributed with a spacing of 106 $\mu$m, then as shown in FIG. 1M, two similar assemblies B-1 and B-2 are used, each comprising one block 26 and one connection card 41, and they are placed face to face as shown in the drawing, but with the blocks 26 of these two assemblies being positioned with respect to one another such that the assembly of heads of one of these two blocks is offset by one-half spacing interval with respect to the assembly of heads of the other block. When this placement has been completed, the two caps 44 and 45 are assembled with the aid of the screws 46, in order to obtain a rigid module. This module is then subjected to monitoring, intended to verify the proper functioning of the electrical circuits it includes. After that, it can be put into place inside the data recording equipment for which it is intended.

Figure 7:
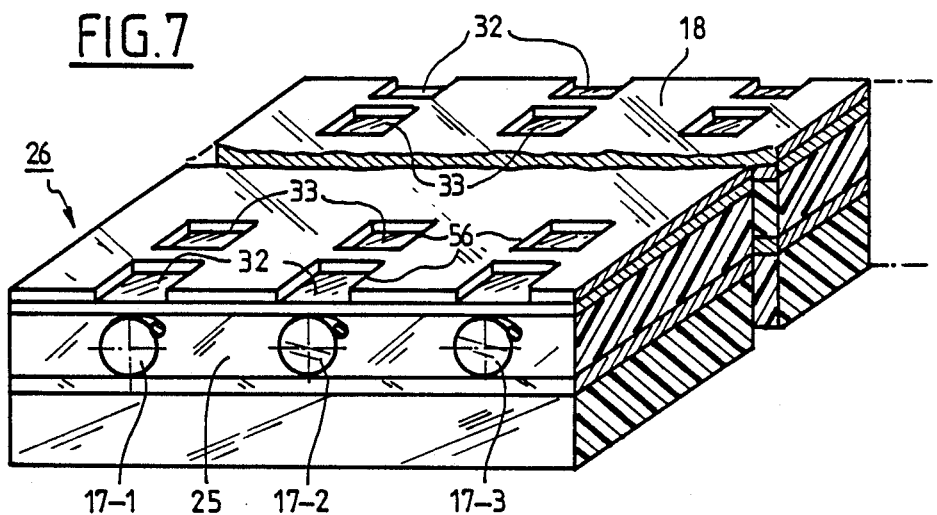
FIG. 7 shows a variant embodiment of the first embodiment of the method shown in FIGS. 1A-1M.

In a variant of the method that has just been described, instead of a continuous metal sheet 18, a metal sheet 18 can be used that as shown in FIG. 7 is provided with recesses 56 made along the same placements as those where the regions 32 and 33 shown in FIG. 1C are located. The importance of this variant is that in the method of the invention, it allows the phases described above with respect to FIGS. 1D, 1E and 1F to be omitted.

Figure 1X:
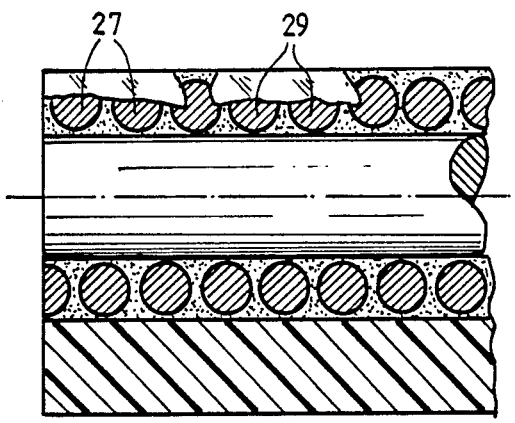
FIGS. 1X and 1Y show the variants in execution of certain phases of the method illustrated in FIGS. 1A-1M.
Figure 1Y:
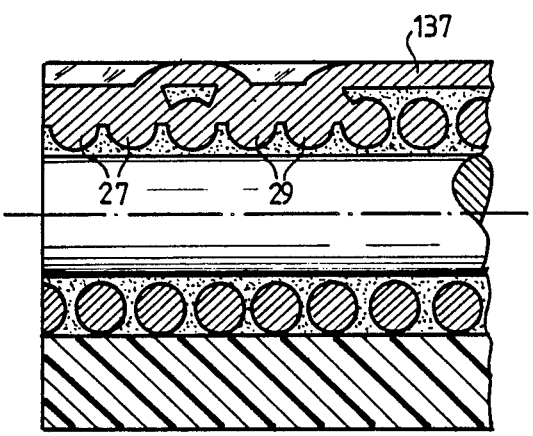

In another variant of the performance of the method that has just been described, after the block 26 has been subjected to the reactive ion etching operation and after the exposed turns and the metal sheet 18 (1G) have been cleaned, this metal sheet, which has played the role of a mask during this etching operation, is removed. This sheet 18, which in the present example is of copper, is eliminated by attack with an iron perchloride solution during the proper period of time necessary for this elimination. This operation, the result of which is shown in FIG. 1X, also has the effect of attacking the exposed groups of turns 29. Meanwhile, taking into account the attack time and the fact that the diameter of these turns is considerably greater than the thickness of the sheet 18, these turns 29 are attacked only partially. The attack of these turns can also be prevented by depositing upon them, before the sheet 18 is eliminated, a protective film of a known type, such as a film of photosensitive resist, this film then being removed again once the operation of eliminating the sheet 18 has been completed. After that, as FIG. 1Y shows, a conductive metal film 137 is deposited over the entire face of the block 26 on which the sheet 18 is located, this deposition of the film being performed either chemically or by cathodic sputtering. This metal film 137, which is preferably of copper or nickel and has a thickness on the order of about 20 $\mu$m, plays the same role as the assembly formed by the metal foil 18 and the conductive film 37 shown in FIG. 1H; that is, this film 137, which permits the interconnection of the turns comprising the first and second groups of turns with one another, is intended to be etched in such a manner that on the face on which it has been deposited, a series of conductor bars and contact zones, similar to those shown in FIGS. 4A, 4B and 5A, 5B are formed. These etching operations will not be described here, because they are similar to those that have already been described above with reference to FIGS. 1I–1L.

Figure 2A:
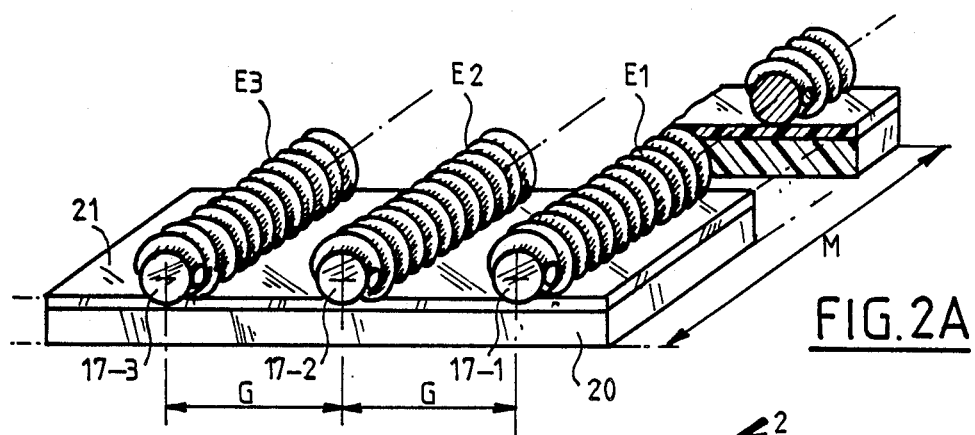
FIGS. 2A-2L illustrate the various phases of a second embodiment of the method of manufacture with which a magnetic transducer can be obtained according to the invention.
Figure 2B:
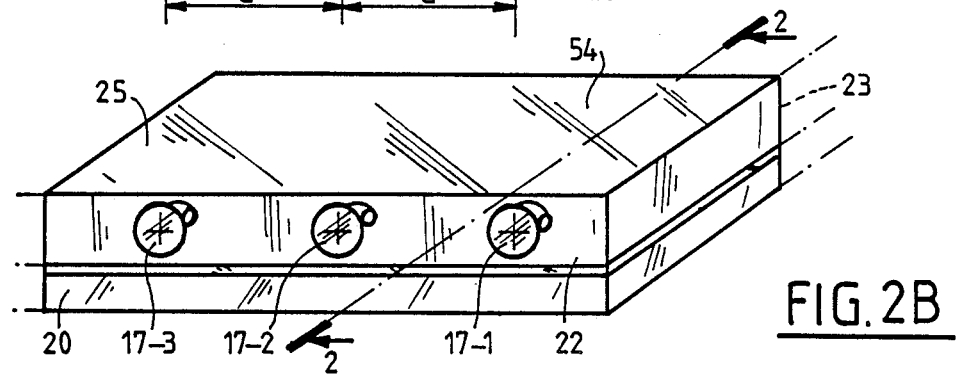
Figure 2C:
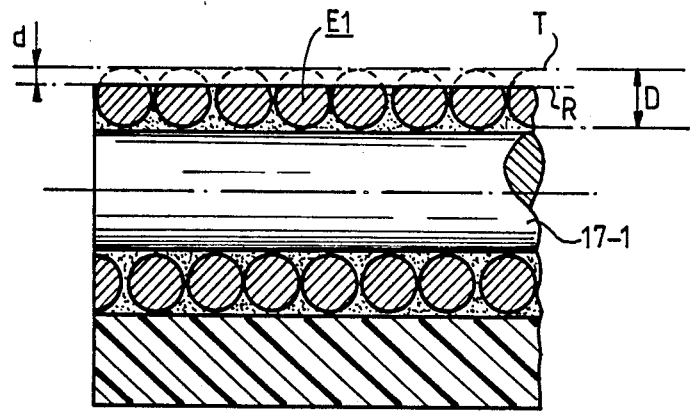

The block 26 which is to be emplaced inside the package shown in FIG. 1M may also be embodied in accordance with a second embodiment which will now be described, referring to FIGS. 2A–2L. In this embodiment, as FIG. 2A shows, the point of departure is a support plate 20 and p magnetic cores 17-1, 17-2, 17-p, each provided with a winding E1, E2, ..., Ep; all these elements are similar to those described above. Once the surface of this support plate has been coated with a film 21 of adhesive insulating material, the magnetic cores 17-1, 17-2, . . . , 17-p and their respective windings E1, E2, . . . , Ep are placed on this surface one beside the other, parallel to the width M of the support plate 20, such that the cores are disposed at regular intervals, in a spacing G that in the example described is equal to 212 μm. Once the fixation of these coils on the support plate 20 has been completed, a film 25 of insulating resin is copy-molded onto the assembly thus obtained, as shown in FIG. 2B, in such a manner that the windings coiled on these cores are completely embedded inside this film. After hardening of the resin, a block 26 is obtained, which is parallelepiped in shape and is shown in FIG. 2B. This block 26, one of the faces of which comprises the hardened surface 54 of the resin film 25, has two other faces 22 and 23, on which the ends of the magnetic cores appear. The surface 54 of this block 26 is then subjected to a mechanical surface treatment, which as can be seen in FIG. 2C is intended to erode the upper portion of the turns comprising the windings E1, E2, . . . , Ep, and thus expose all these turns. In FIG. 2C, d indicates the spacing between the surface R obtained via this operation and the plane surface T, which prior to this operation was tangent to all the turns of the windings; thus this distance d measures the extent of surface treatment performed. To prevent the reduction in cross section of the turns brought about by this operation from being exaggerated, it is provided that in practice the value of d should be equal to at least one-half the diameter D of the turns. Accordingly, in the example described, d equals practically 0.4 D.

Figure 2D:
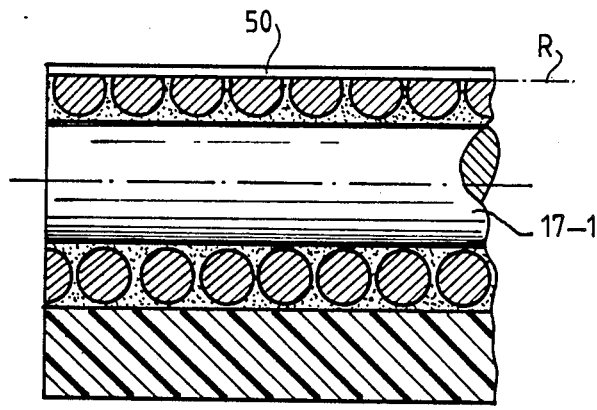
Figure 2E:
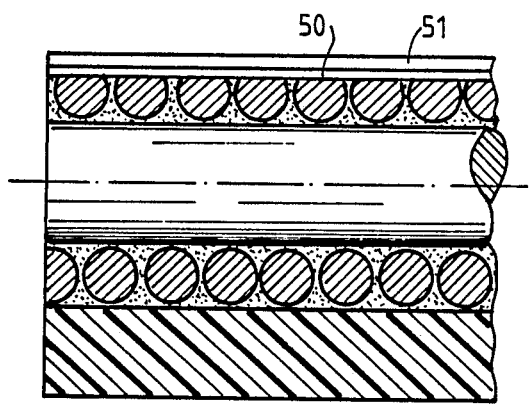
Figure 2F:
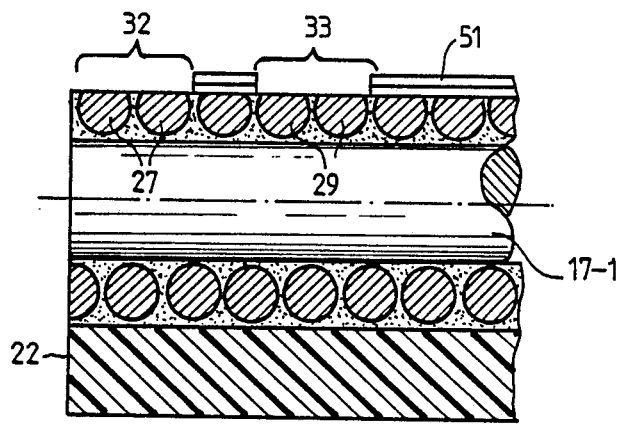

Once this operation is completed, a film 50 of insulating material is deposited on the surface R, as shown in FIG. 2D. The material preferably used for this film 50 in the example described is a polyamide resin industrially produced by DuPont de Nemours under the name "PYRALIN". Then this resin is subjected to precuring at a moderate temperature, which causes partial imidization of this resin; then, as FIG. 2E shows, it is covered with a coating 51 of photosensitive resist. After precuring and insulation through a mask, this resist coating is developed; the mask and the type of resist used are such that at the end of these operations, the resist coating 51 has been eliminated, as shown in FIG. 2F, from the regions 32 and 33 of the film 50 that are located facing the second groups of turns 27 and 28 and the first groups of turns 29 and 30, respectively, of each winding, these groups of turns being similar to those shown in FIG. 1D. However, the resin comprising the film 50, because it did not undergo partial polymerization, has the property of being attacked by the chemical agent used for developing the photosensitive resist. Under these conditions, once the resist coating 51 has been eliminated by this agent from the regions 32 and 33, the film 50 which has now been exposed in these regions is attacked in turn, so that by definition the first and second groups of turns are now exposed as well.

Figure 2G:
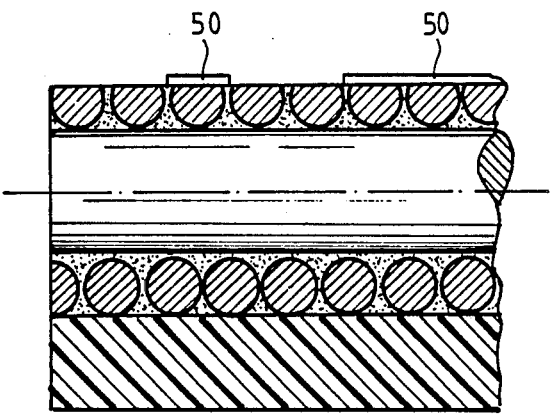

Once this operation is completed, then as shown in FIG. 2G the remaining portions of the photosensitive resist 51 are removed, which is done in a known manner, for example by immersion in acetone. After that, the remaining portions of the resin film 50 are subjected to curing at a temperature that allows the complete polymerization of this resin, and then the exposed portions of the first and second groups of turns are cleaned by immersion in a solution of ammonium persulfate and are then subjected to ionic cleaning by argon bombardment.

Figure 2H:
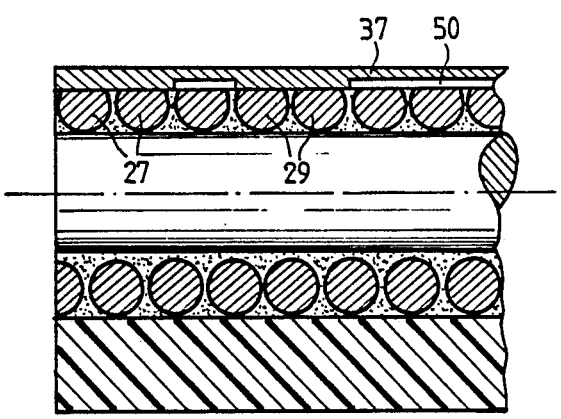
Figure 2I:
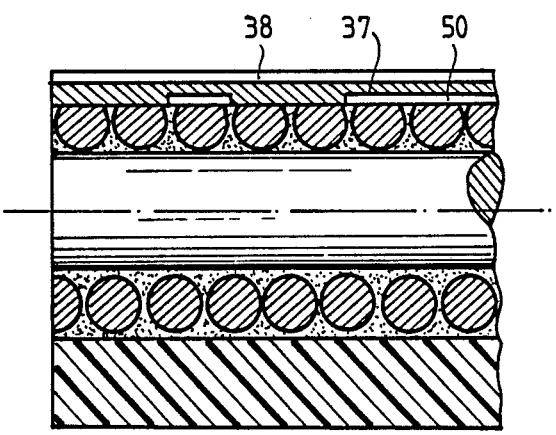
Figure 2J:
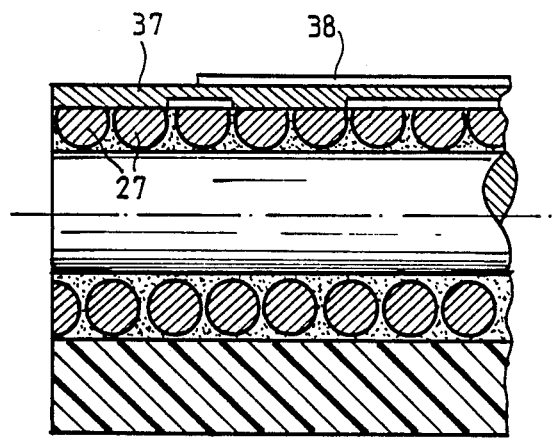
Figure 2K:
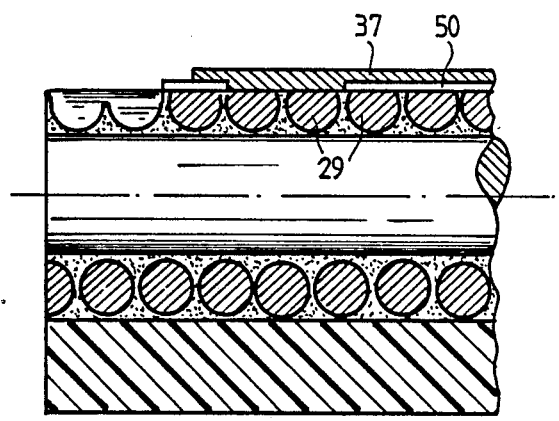
Figure 2L:
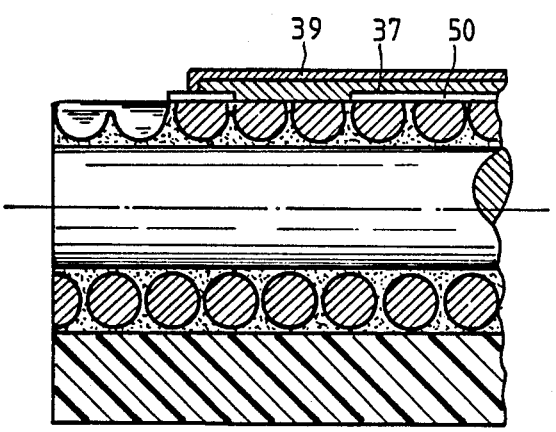

Once this cleaning has been completed, then as shown in FIG. 2H a film 37 of conductive metal is deposited on the remaining film 50 and on the regions where the turns have been exposed. In the example described, this film 37 is of copper and it is preferably deposited chemically or by cathodic sputtering.

The operations that are then performed are similar to those that have been described above, referring to FIGS. 1I–1M. Without repeating all the above explanations, it will be readily understood in conjunction with FIGS. 2I–2L that these operations comprise depositing on the film 37 a coating 38 of photosensitive resist (FIG. 2I); after precuring and insulation through a suitable mask, this coating is partially eliminated from the surface of the film 37 (FIG. 2J), the non-eliminated portions of this coating forming (p+1) resist strips 38c, 38-1, 38-2, . . . , 38-p, disposed similarly to the manner shown in FIG. 6, on the film 37. The metal film 37, thus partially coated with these resist strips, is then subjected to chemical etching (FIG. 2K), which eliminates the portions of this film that are not protected with the resist strips, on the one hand, and on the other hand practically eliminates all the second groups of turns 27 and 28 of the various windings. Once this operation is completed and the resist strips are removed, a block 26 is thus obtained similar to that shown in FIGS. 4A and 4B, this block being provided on one of its faces with conductor bars 37c, 37-1, 37-2, . . . , 37-p and p contact zones P-1, P-2, . . . , P-p; the bar 37c and the p contact zones are intended for connection with the contact zones of a connection card of the type identified by reference numeral 41 in FIG. 1M. Meanwhile, before these connections are made, a protective metal coating 39 is deposited (FIG. 2L) on the contact zones and conductor bars of this block.

Zones of a connection card of the type identified by reference numeral 41 in FIG. 1M. Meanwhile, before these connections are made, a protective metal coating 39 is deposited (FIG. 2L) on the contact zones and conductor bars of this block.

The block 26 that is thus obtained is subjected to the same operations (surface treatment of the faces 22, 23 and optional sawing) as those of the block made by the first embodiment of the method. After that, this block is juxtaposed with a connection card 41 so as to comprise an assembly intended for placement inside a package of the type shown in FIG. 1M. The electrical connections among the contact zones of the card and the contact zones and the bar 37c of the block are then made. Finally, the two caps 44 and 45 of the package are assembled, so as to obtain a rigid module which after inspection can be put into place in data recording equipment.

In a variant of the method that has just been described, instead of depositing a film 50 of insulating material over the entire surface, it is possible for this film to be deposited only on those portions of the surface where it is intended to remain permanently. The advantage of this procedure is that in the method according to the second embodiment, the phases described above with reference to FIGS. 2D, 2E and 2F can be omitted. It should also be noted that although in the example described this film 50 comprises a polyamide resin, any other suitable insulating material can also be used to form this film, for example such as boron nitride or silicon nitride.

Thus as indicated above, the mask used in the two above-described embodiments for insulating the resist coating 38 has a configuration such that the conductor bars and contact zones obtained by photoetching of the metal film 37 are disposed in the manner shown in FIGS. 4A and 4B. In this arrangement, the conductor bar 37c, which is connected to the first groups of turns 30, extends above these turns parallel to and in proximity with the face 23 of the block 26, and the contact zones P-1, P-2, . . . , P-p, which are formed in the vicinity of this bar 37c, are connected to the first groups of turns 29 via bars 37-1, 37-2, . . . , 37-p. It should be noted, however, that this arrangement is not exclusive in the invention, and that by using a suitable photoetching mask, it is also possible to use a different arrangement, for example such as that shown in FIGS. 5A and 5B, in which the p contact zones P-1, P-2, . . . , P-p, which are located in the same emplacements as those that they occupy in FIGS. 4A and 4B, are no longer connected to first groups 29 of turns but rather to the first groups 30 of turns, which consequently greatly reduces the length of the bars 37-1, 37-2, . . . , 37-p. In this arrangement, the conductor bar 37c, which is connected to the first groups of turns 29, extends above these turns parallel to and in proximity with the other face 22 of the block 26. Since under these conditions this bar 37c is relatively far from the face 23 beside which the connection card 41, to which the block 26 must normally be connected, must be located, an additional contact zone PC has been formed next to the assembly of zones P-1, P-2, . . . , P-p; this zone PC, connected to the bar 37c via a conductor strip 55, thus makes it possible to reduce the length of the jumper wire 48 that is require to assure the connection of this bar 37c with a corresponding contact zone of the connection card.

It should also be noted that although only one conductor bar 37, for assuring the return of the currents circulating within the various windings, has been provided in the configurations shown in FIGS. 4A, 4B, 5A and 5B, it is also possible by using a suitable photoetching mask to obtain a different configuration, in which a plurality of conductor bars are provided for assuring the return of these currents.

It will be understood that the invention is in no way limited to the embodiments described and shown herein, which are given solely by way of example. On the contrary, it includes any means comprising technical equivalents of the embodiments described and shown herein, whether taken singly or in combination with one another, and as defined by the appended claims.

What is claimed is:

1. A method for manufacturing a magnetic transducer adapted for the recording and/or reading of data on a magnetic carrier (12), this transducer including at least one row of p magnetic heads (T1, T2, T3), each of these heads comprising an elongated magnetic core provided with an excitation winding, comprises forming a winding (such as E1) of insulated conductor wire on each elongated magnetic core (such as 17-1);

making at least one elementary block (26) by disposing p cores, each provided with a winding, on a support plate (20) having two opposed edges (22 and 23), in such a manner that these p cores extend between these two edges;

embedding all of these p cores in a film (25) of hardenable insulating substance;

attacking the surface (54) of said film, after hardening of this substance, to expose two first groups of turns (29 and 30) on each winding, said two first groups of turns being located respectively in the vicinity of each of the ends of said winding;

and forming, on said surface (54), contact zones (P-1, P2, . . . , P-p, 37c) connected to said first groups of turns, in such a manner as to allow connecting these windings to an electrical control circuit.

2. A method for manufacturing a magnetic transducer as defined by claim 1, characterized in that each winding extends over the entire length of the core about which it is wound, the method further comprising:

attacking the surface (54) of the film of insulating substance such as to also expose on each winding two second groups of turns (27 and 28) located respectively in proximity with each of the edges of said winding, between this end and the first group of turns (29 or 30) which is adjacent to this end, and eliminating on each winding said second group of turns (27 and 28).

3. A method for manufacturing a magnetic transducer as defined by claim 1, characterized in that the contact zones formed on the surface (54) are realized in such a manner as to comprise on the one hand p contact zones (P-1, P-2, . . . , P-p) each respectively connected to one of the two first groups of turns of each of the p windings, and on the other hand at least one contact zone (37c) connected to the other first group of turns of each winding.

4. A method for manufacturing a magnetic transducer as defined by claim 2, characterized in that the contact zones formed on the surface (54) are realized in such a manner as to comprise on the one hand p contact zones (P-1, P-2, . . . , P-p) each respectively connected to one of the two first groups of turns of each of the p windings, and on the other hand at least one contact zone (37c) connected to the other first group of turns of each winding.

5. A method for manufacturing a magnetic transducer as defined by claim 1, characterized in that to obtain a positioning of the p cores on the support plate (20), the method comprises first fixing these p cores, provided with their windings, on a metal sheet (18), parallel to one another and in such a manner that these cores are distributed at regular intervals on this sheet; then turning over the assembly thus obtained, and finally affixing it to the support plate (20) in such a manner that the p cores which are thus interposed between this sheet (18) and this plate (20) extend between the two proposed edges (22 and 23) of the plate.

6. A method for manufacturing a magnetic transducer as defined by claim 2, characterized in that to obtain a positioning of the p cores on the support plate (20), the method comprises first fixing these p cores, provided with their windings, on a metal sheet (18), parallel to one another and in such a manner that these cores are distributed at regular intervals on this sheet; then turning over the assembly thus obtained, and finally affixing it to the support plate (20) in such a manner that the p cores which are thus interposed between this sheet (18) and this plate (20) extend between the two proposed edges (22 and 23) of the plate.

7. A method for manufacturing a magnetic transducer as defined by claim 3, characterized in that to obtain a positioning of the p cores on the support plate (20), the method comprises first fixing these p cores, provided with their windings, on a metal sheet (18), parallel to one another and in such a manner that these cores are distributed at regular intervals on this sheet; then turning over the assembly thus obtained, and finally affixing it to the support plate (20) in such a manner that the p cores which are thus interposed between this sheet (18) and this plate (20) extend between the two proposed edges (22 and 23) of the plate.

8. A method for manufacturing a magnetic transducer as defined by claim 4, characterized in that to obtain a positioning of the p cores on the support plate (20), the method comprises first fixing these p cores, provided with their windings, on a metal sheet (18), parallel to one another and in such a manner that these cores are distributed at regular intervals on this sheet; then turning over the assembly thus obtained, and finally affixing it to the support plate (20) in such a manner that the p cores which are thus interposed between this sheet (18) and this plate (20) extend between the two proposed edges (22 and 23) of the plate.

9. A method for manufacturing a magnetic transducer as defined by claim 5, characterized in that the coating of the p cores in the hardenable insulating substance is realized by injecting said substance between the support plate (20) and the metal sheet (18) by a technique of impregnation under a vacuum.

10. A method for manufacturing a magnetic transducer as defined by claim 5, characterized in that it further comprises eliminating the portions (32, 33) of this sheet (18) which are located perpendicular to these groups of turns (27, 28, 29, 30), prior to undertaking the attack of the film of insulating substance (25) for exposing the first and second groups of turns.

11. A method for manufacturing a magnetic transducer as defined by claim 5, characterized in that it further comprises eliminating the portions (32, 33) of this sheet (18) which are located perpendicular to these groups of turns (27, 28, 29, 30), prior to undertaking the attack of the film of insulating substance (25) for exposing the first and second groups of turns.

12. A method for manufacturing a magnetic transducer as defined by claim 5, characterized in that the metal sheet (18) is provided with recesses (56) which are made prior to the emplacement of the p cores on this sheet and are disposed in such a manner that once these cores have been fixed with their windings on this sheet, these recesses are located perpendicular to the first and second groups of turns.

13. A method for manufacturing a magnetic transducer as defined by claim 5, characterized in that the metal sheet (18) is provided with recesses (56) which are made prior to the emplacement of the p cores on this sheet and are disposed in such a manner that once these cores have been fixed with their windings on this sheet, these recesses are located perpendicular to the first and second group of turns.

14. A method for manufacturing a magnetic transducer as defined by claim 10, characterized in that it further comprises, after exposing the first and second groups of turns but prior to elimination of the second groups of turns, depositing on the sheet (18) and the exposed turns a metal film (37) which allows these turns to be connected with one another and with the sheet (18) via an electrically conductive material.

15. A method for manufacturing a magnetic transducer as defined by claim 12, characterized in that it further comprises, after exposing the first and second groups of turns but prior to elimination of the second group of turns, depositing on the sheet (18) and the exposed turns a metal film (37) which allows these turns to be connected with one another and with the sheet (18) via an electrically conductive material.

16. A method for manufacturing a magnetic transducer as defined by claim 10, characterized in that it further comprises, after exposing the first and second groups of turns:
eliminating the metal sheet (18) and depositing over the entire surface of the face of the block (26) on which this sheet is located a conductive metal film (137) which allows the exposed turns to be connected with one another via an electrically conductive material.

17. A method for manufacturing a magnetic transducer as defined by claim 12, characterized in that it further comprises, after exposing the first and second group of turns:
eliminating the metal sheet (18) and depositing over the entire surface of the face of the block (26) on which this sheet is located a conductive metal film (137) which allows the exposed turns to be connected with one another via an electrically conductive material.

18. A method for manufacturing a magnetic transducer as defined by claim 1, characterized in that the attack of the surface (54) of the film of insulating substance (25) is accomplished by subjecting this surface to mechanical surface treatment sufficient to erode the upper portion of the turns comprising the windings, and thus exposing all these turns.

19. A method for manufacturing a magnetic transducer as defined by claim 18, characterized in that it further comprises, after surface treatment of the surface (54), depositing thereon a film (50) of insulating material, in such a manner that the first and second groups of turns (29, 30, 27, 28) are not covered by this film.

20. A method for manufacturing a magnetic transducer as defined by claim 19, characterized in that it further comprises, prior to eliminating the second groups of turns (27, 28), depositing on the exposed turns and on the film (50) of insulating material a metal film (37) which allows these turns to be connected with one another via an electrically conductive material.

21. A method for manufacturing a magnetic transducer as defined by claim 14, characterized in that the (p+1) contact zones (37c, P-1, P-2, ..., P-p) are obtained by photoetching of the metal film (37 or 137), this etching being effected in such a manner as to allow one of the two (29, for example) first groups of turns of each winding to be connected respectively to one of the p contact zones (P-1, P-2, ..., P-p) thus formed, and to allow the other first group of turns (30, for example) of each winding to be connected to the (p+1)th contact zone (37c).

22. A method for manufacturing a magnetic transducer as defined by claim 16, characterized in that the (p+1) contact zones (37c, P-1, P-2, ..., P-p) are obtained by photoetching of the metal film (37 or 137), this etching being effected in such a manner as to allow one of the two (29, for example) first groups of turns of each winding to be connected respectively to one of the p contact zones (P-1, P-2, ..., P-p) thus formed, and to allow the other first group of turns (30, for example) of each winding to be connected to the (p+1)th contact zone (37c).

23. A method for manufacturing a magnetic transducer as defined by claim 20, characterized in that the (p+1) contact zones (37c, P-1, P-2, ..., P-p) are obtained by photoetching of the metal film (37 or 137), this etching being effected in such a manner as to allow one of the two (29, for example) first groups of turns of each winding to be connected respectively to one of the p contact zones (P-1, P-2, . . . , P-p) thus formed, and to allow the other first group of turns (30, for example) of each winding to be connected to the (p+1)th contact zone (37c).

24. A method for manufacturing a magnetic transducer as defined by claim 1, characterized in that it further comprises:

fixing each elementary block (26) against one edge of a card (41) equipped with a printed circuit and with components (42) belonging to the electrical control circuit (11), this printed circuit being shaped so as to have contact zones (43) along said edge;

and connecting these contact zones (43) to the contact zones (P-1, P-2, . . . , P-p, 37c) of said elementary block (26).

* * * * *

UNITED STATES PATENT AND TRADEMARK OFFICE
CERTIFICATE OF CORRECTION

PATENT NO. : 4,811,476

DATED : March 14, 1989

INVENTOR(S) : Philippe Raulin et al

It is certified that error appears in the above-identified patent and that said Letters Patent is hereby corrected as shown below:

Column 16,

Claim 1, Line 4, "P2" should be --P-2--.

Signed and Sealed this

Seventh Day of November, 1989

*Attest:*

JEFFREY M. SAMUELS

*Attesting Officer*   *Acting Commissioner of Patents and Trademarks*